(12) United States Patent
Percy et al.

(10) Patent No.: US 12,066,291 B2
(45) Date of Patent: Aug. 20, 2024

(54) POSITIONING GUIDANCE METHOD AND SYSTEM

(71) Applicants: Iain Bryden Percy, Cambridge (GB); Owen Brice Modral, Cambridge (GB)

(72) Inventors: Iain Bryden Percy, Cambridge (GB); Owen Brice Modral, Cambridge (GB)

( * ) Notice: Subject to any disclaimer, the term of this patent is extended or adjusted under 35 U.S.C. 154(b) by 611 days.

(21) Appl. No.: 15/733,845

(22) PCT Filed: May 31, 2019

(86) PCT No.: PCT/GB2019/051525
§ 371 (c)(1),
(2) Date: Nov. 30, 2020

(87) PCT Pub. No.: WO2019/229478
PCT Pub. Date: Dec. 5, 2019

(65) Prior Publication Data
US 2021/0215486 A1 Jul. 15, 2021

(30) Foreign Application Priority Data
Jun. 1, 2018 (GB) .................... 1808997

(51) Int. Cl.
*G01C 21/00* (2006.01)
*B63H 25/04* (2006.01)
*G01C 21/20* (2006.01)

(52) U.S. Cl.
CPC .......... *G01C 21/203* (2013.01); *B63H 25/04* (2013.01); *B63H 2025/045* (2013.01)

(58) Field of Classification Search
CPC . G01C 21/203; B63H 25/04; B63H 2025/045
USPC .......................................... 701/21
See application file for complete search history.

(56) References Cited

U.S. PATENT DOCUMENTS

| | | | |
|---|---|---|---|
| 2013/0054138 A1* | 2/2013 | Clark | G01C 21/203 701/482 |
| 2016/0091318 A1* | 3/2016 | Silfven | G01C 21/203 701/439 |
| 2016/0370187 A1* | 12/2016 | Gatland | G01C 21/203 |
| 2018/0276351 A1* | 9/2018 | Patton | H04L 51/52 |

FOREIGN PATENT DOCUMENTS

GB 2505121 A 2/2014

\* cited by examiner

*Primary Examiner* — Tiffany P Young
(74) *Attorney, Agent, or Firm* — Thomas Horstemeyer, LLP

(57) ABSTRACT

A system and method for tactically positioning a sailing boat are defined which calculate a plurality of predicted locations the sailing boat may be situated in order to arrive at a destination at a target time by following a predetermined route. The plurality of predicted locations define a zone which is visually represented with the current location of the sailing boat. to accurate guidance of the sailing boat.

25 Claims, 7 Drawing Sheets

POSITIONING GUIDANCE METHOD AND SYSTEM

CROSS-REFERENCE TO RELATED APPLICATION

This application is the 35 U.S.C. § 371 national stage application of PCT Application No. PCT/GB2019/051525, entitled "POSITIONING GUIDANCE METHOD AND SYSTEM" and filed May 31, 2019, which claims priority to and the benefit of GB Patent Application No. 1808997.9, entitled "POSITIONING GUIDANCE METHOD AND SYSTEM" and filed on Jun. 1, 2018, the content of each of which is incorporated by reference as if set forth herein in their entireties.

FIELD OF INVENTION

This invention relates to a positional guidance method and system.

BACKGROUND

In a sailing boat race, it is very important to arrive at the start line at a precise time. Arriving too early results in a time penalty; arriving too late puts the boat in a disadvantageous position for the rest of the race. In addition, the helmsman must also consider the relative positions of other boats taking part in the race. For example, various racing rules govern which boats have right of way in order to avoid collisions. Additionally, the sail of a boat can produce turbulent airflow for another boat, so-called "dirty air." These considerations can be tactically leveraged by a boat's crew to manoeuvre a boat into an advantageous position relative to other boats before the race starts.

Various on-board systems are used to present information to crew members which allows the crew to navigate towards a destination in order to arrive at the destination at a target time. However, these known systems provide estimations which are highly sensitive to small variations in speed and heading. An example of such a known system is shown in FIG. 1 which depicts a sailing boat 101 sailing towards a starting line 102. As will be described in more detail below, the system shown in FIG. 1 provides an estimation of the amount of time it will take the sailing boat 101 to arrive at the destination 102 according to a number of calculated routes to the destination.

However, the system of FIG. 1 is only able to provide accurate guidance for a limited number of calculated routes (numbered 108 to 111) to the starting line 102. This is not reflective of real racing conditions, as the number of possible navigation options available to the sailing boat crew greatly exceeds the limited number of routes displayed by the system of FIG. 1. Additionally, as each route is calculated based on the sailing boat's heading, so small variations in the sailing boat's heading produce large variations in the arrival time estimations. Equally, small variations in heading are exacerbated the further the sailing boat is from the destination.

The above considerations apply equally when the sailing boat is heading towards any target destination other than a starting line, such as a waypoint of a route.

SUMMARY OF INVENTION

The invention is defined by the independent claims, to which reference is now drawn. Preferable features are laid out in the dependent claims.

In a first aspect of the invention, a positional guidance system for a sailing boat comprises a database configured to receive and store an optimum boat speed based on input data, a timing module configured to identify an arrival time for the sailing boat to arrive at the destination, a calculation module configured to periodically calculate a predicted boat location for a bearing associated with a predetermined route to a destination based on the arrival time and optimum boat speed, a processor configured to define a zone bounded at least in part by the predicted boat location, and a display configured to display a visual representation of the zone.

In an embodiment of the invention, one or more boat performance configurations are adjusted in response to the displayed visual representation.

In another embodiment of the invention, the display forms part of a computing device.

In another embodiment of the invention, the computing device is a desktop computer, a laptop computer, a tablet computer, a personal digital assistant, a mobile telephone, a smartphone, a smart watch or a pair of smart glasses.

An embodiment of the invention further comprises a location module for identifying the current location of the sailing boat.

In another embodiment of the invention, the display is further configured to display the current location of the sailing boat.

In another embodiment of the invention, the display forms part of an augmented reality system.

In another embodiment of the invention, the calculation module calculates a predicted boat location for each of a plurality of bearings.

An embodiment of the invention further comprises sensors for at least partially providing input data.

An embodiment of the invention further comprises a communication source for at least partially providing input data.

An embodiment of the invention further comprises an interactive portion for at least partially providing input data.

In another embodiment of the invention, the input data comprises wind data and/or boat speed data.

In another embodiment of the invention, the predicted boat location is calculated based on known route parameters associated with the predetermined route.

In another embodiment of the invention, the predetermined route comprises a straight line to the destination.

In another embodiment of the invention, the predetermined route further comprises a curved path onto a predetermined bearing when approaching the destination.

In another embodiment of the invention, the predetermined route comprises a straight line to a layline associated with the destination and travelling to the destination along the layline.

In another embodiment of the invention, the known route parameters include one or more scaling parameters, route curvature parameters and/or acceleration parameters.

In another embodiment of the invention, the destination is a boundary line, a waypoint on a journey or a specified location.

In another embodiment of the invention, a zone is defined for each of a plurality of destinations.

In another embodiment of the invention, the arrival time is a target time to reach a destination.

In a second aspect of the invention, a positional guidance method for a sailing boat includes obtaining an optimum boat speed based on input data, identifying, with a timing module, an arrival time for the sailing boat to arrive at the destination, calculating, with a calculating module, a predicted boat location for a bearing associated with a predetermined route to a destination, the predicted boat location based on the optimum boat speed and the arrival time, defining, with a processor, a zone bounded at least in part by the predicted boat location, repeating the above steps periodically, and displaying, with a display, a visual representation of the zone.

In an embodiment of the invention, the obtaining an optimum boat speed based on input data comprises calculating the optimum boat speed with a calculating module.

An embodiment of the invention further comprises the step of adjusting boat performance configurations in response to the displayed visual representation.

An embodiment of the invention further comprises identifying, with a location module, a current location associated with the sailing boat.

An embodiment of the invention further comprises displaying, with the display, the current location of the sailing boat.

In another embodiment of the invention, the at least one bearing comprises a plurality of bearings.

In another embodiment of the invention, the input data is at least partially provided by at least one sensor.

In another embodiment of the invention, the input data is at least partially provided by a communication source.

In another embodiment of the invention, the input data is at least partially manually input.

In another embodiment of the invention, the input data comprises wind data and/or boat speed data.

In another embodiment of the invention, calculating the predicted boat location is further based on known route parameters associated with the route.

In another embodiment of the invention, the route comprises a straight line to the destination.

In another embodiment of the invention, the route further comprises a curved path onto a predetermined bearing when approaching the destination.

In another embodiment of the invention, the route comprises a straight line to a layline associated with the destination and travelling to the destination along the layline.

In another embodiment of the invention, the known route parameters include one or more scaling parameters, route curvature parameters and/or acceleration parameters.

In another embodiment of the invention, the destination is a boundary line, a waypoint on a journey or a specified location.

An embodiment of the invention further comprises a plurality of destinations, wherein the method of any of claims 21 to 35 are repeated for each of the plurality of destinations.

In another embodiment of the invention, the arrival time may be the time until the start of a race or a target time to reach a destination.

In a final aspect of the invention, a computer program product executes steps of the second aspect of the invention.

DETAILED DESCRIPTION

Embodiments of the invention will now be described, by way of example only, with reference to the accompanying drawings, in which:

FIG. 1 illustrates a known positioning guidance display 100 for providing a boat helmsman with guidance for arriving at a destination at a target time.

Figure 1:
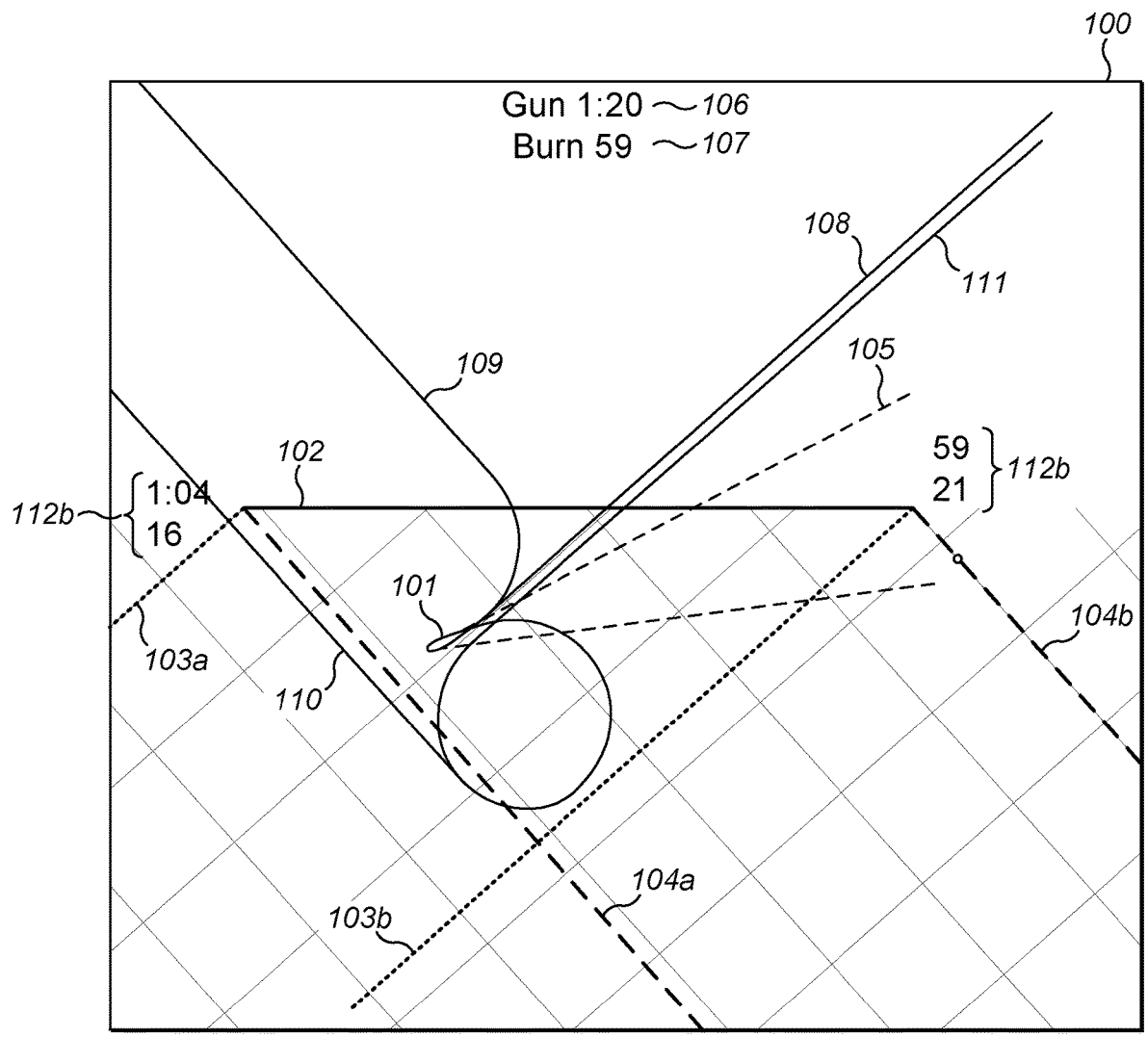
FIG. 1 shows a display image from a known positioning guidance system.

FIG. 1 shows a sailing boat 101 heading towards a destination 102 which in the example of FIG. 1 is a starting line. Port laylines 103a, 103b and starboard laylines 104a, 104b extend from markers defining the destination 102. A layline is known in the art as a straight line extending from a marker which indicates the optimum course a sailing boat should take in order to pass the marker on the windward side without having to change direction. The directions the laylines extend therefore signify an optimum angle to the wind which, when travelled along at a target speed, provides the fastest route to the destination. The direction of the laylines is dependent upon the prevailing wind speed and direction and may be calculated using methods and techniques known in the art.

The display 100 includes a heading indicia 105 which indicates the current heading of the sailing boat 101 which may be based on data received from suitable means such as a compass. The display 100 also includes a time to gun indicia 106 and a time to burn indicia 107. The time to gun indicia 106 indicates the amount of time remaining before a sailing race commences. In the example shown in FIG. 1, the remaining time until the race starts is 1 minute 20 seconds. The time to burn predicts how early or late the sailing boat 101 would arrive at the starting line or a chosen point of that starting line. In the example of FIG. 1, display 100 also indicates four suggested routes 108, 109, 110 and 111. Although not displayed here, known systems such as those shown in FIG. 1 would often provide a time to burn for each of a finite number of specific suggested routes. In addition to the above, display 100 also provides port end indicia 112a and starboard end indicia 112b, which indicate a time to burn and an estimated time to sail to the port and starboard ends of the starting line respectively. In the example shown in FIG. 1, the starboard end time to burn indicia 112b indicates that the time to burn for the sailing boat 101 when arriving at the starboard end of the start line on time is 59 seconds based on the sailing boat's current performance and a predicted performance based on the current wind speed and direction and bearing to sail to reach the starboard end. In other words, if the sailing boat adjusted its course towards the starboard end of the line, the boat would arrive at the starboard end of the start line 59 seconds before the scheduled start of the race.

The example positioning guidance display 100 shown in FIG. 1 has significant problems. Firstly, the time to burn calculations are significantly affected by small changes in data associated with the sailing boat, such as the sailing boat's heading and performance. Additionally, small changes in wind conditions can also result in large variations in the calculated time to burn. Faster boats and increased distance from a destination produce even greater variations in the calculated results. Crew members who are presented with displays such as that shown in FIG. 1 often do not appreciate why the calculated numbers fluctuate so much and their ability to effectively use the calculated data to tactically position their sailing boat is diminished. As indicated above, this can have a substantial impact on how the boat performs in racing conditions.

Secondly, the display 100 only predicts the time to burn for a very small number of tactical options, which mostly involve sailing parallel to laylines. However, race start situations are highly complex and require the sailing boat to be manoeuvred in an unrestricted manner, which the simplified options of display 100 cannot provide. Crew members therefore require a more sophisticated solution to the above problems which enables them to effectively and accurately position their boat in racing conditions.

Embodiments of the invention are directed towards an improved positional guidance method and system for a boat, as further described below.

Figure 2:
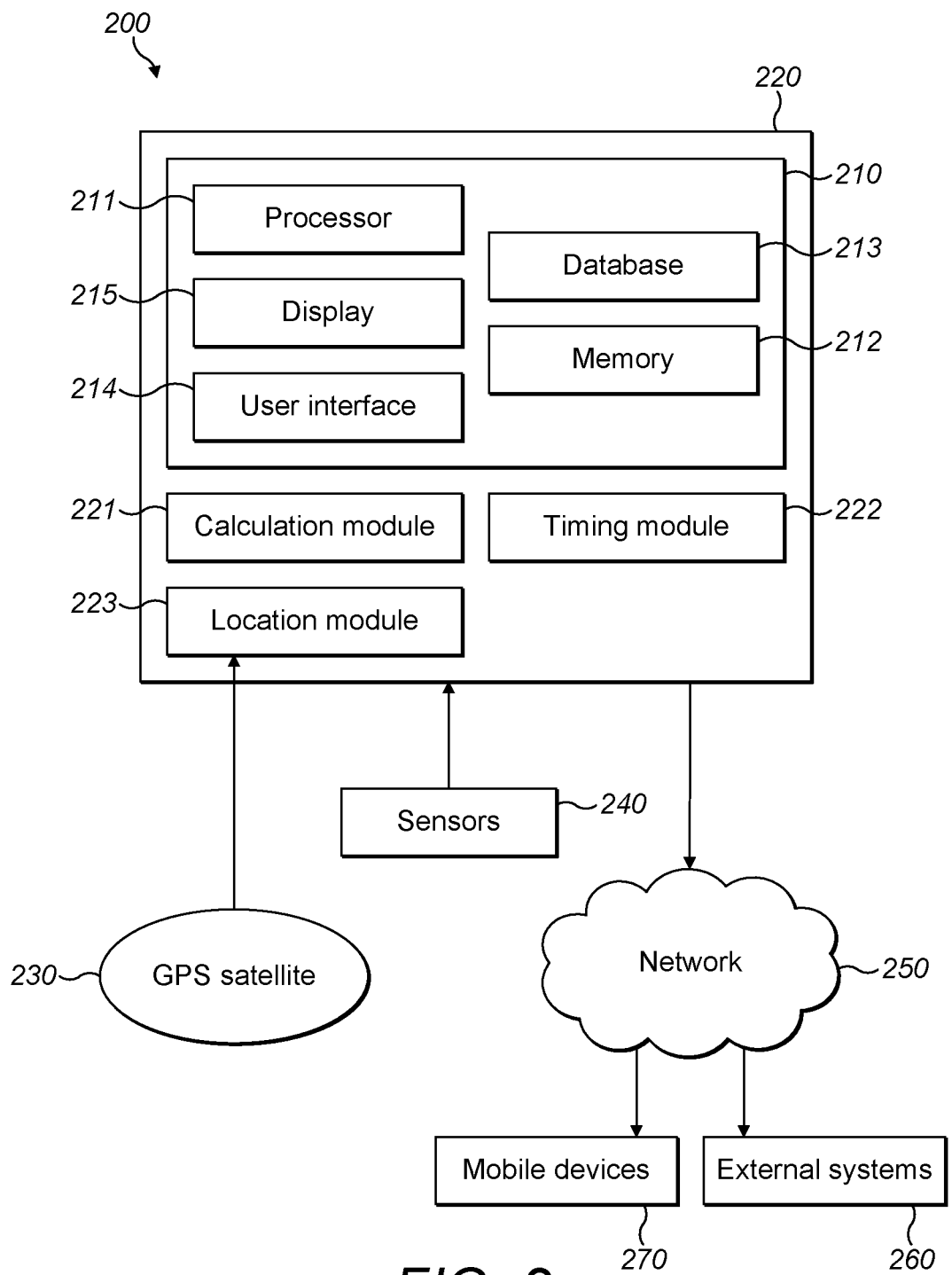
FIG. 2 shows a schematic diagram of an example system architecture according to an embodiment of the invention.

FIG. 2 shows an embodiment of a positional guidance system 200 which includes a computing device 210. The computing device may be any suitable computing device, such as a desktop computer, a laptop computer, a tablet computer, a personal digital assistant, a mobile telephone, a smartphone, a smart watch, smart glasses or any other computing device. The computing device 210 includes a processor 211, a memory 212, a local database 213, a user interface 214 and a display 215.

The processor 211, memory 212 and local database 213 combine to provide means for storing data, executing logic commands and performing arithmetic calculations. In some embodiments, the processor 211 may run one or more server processes for communicating with client devices. The server processes may comprise computer readable program instructions for carrying out the operations of the present invention. The computer readable program instructions may be source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

The computer readable program instructions may be stored on a non-transitory, tangible computer readable medium, such as local database 213. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

User interface 214 enables a user to interact with the positional guidance system 200 and provide feedback and notifications to the user. For example, the user interface 214 may enable the user to access system settings, input data manually, or enable the selection of particular modes of operation of the positional guidance system 200. In some embodiments, the user interface 214 may be provided in the form of a widget embedded in a web site, as an application for a device, or on a dedicated landing web page. Computer readable program instructions for implementing the user interface 214 may be downloaded to the client device from a computer readable storage medium via a network, for example, the Internet, a local area network (LAN), a wide area network (WAN) and/or a wireless network. The instructions may be stored in a computer readable storage medium within the client device.

The display 215 also enables the user to interact with the positional guidance system 200. The display may be any suitable device for displaying information to the user. In some embodiments, the display may form part of an augmented reality (AR) system which enables graphical elements calculated by the positional guidance system 200 to be overlaid onto a user's field of view of their physical environment. In some embodiments, the display may also have at least one interactive portion, thereby enabling the user to make adjustments to the performance and configuration of the boat. In other embodiments, the interactive portion enables a user to manually provide input data, such as wind speed data, to the positional guidance system 200.

The system 200 further includes a navigation device 220 which incorporates the computing device 201 and further comprises a calculation module 221, a timing module 222 and a location module 223. In preferred embodiments, the positional guidance system 200 is implemented in, located on or associated with a boat.

The calculation module 221 stores instructions which enables the processor to calculate parameters and graphical elements to be displayed on display 215. For example, the calculation module 221 may calculate a straight-line distance between the positional guidance system 200 and a destination, an optimum boat speed, port and/or starboard layline position and a target speed. The graphical elements to be displayed on the display may include proximity indicia, boat heading indicia, destination location indicia and layline indicia. In some embodiments, the processor 211, memory 212 and local database 213 form the calculation module 221.

The timing module 222 enables the positional guidance system 200 to monitor a target time for arriving at the destination. In some embodiments, the timing module 222 includes a countdown timer for providing a countdown to the target time. In other embodiments, the timing module 222 includes a communications unit for receiving accurate time information from a suitable communications source, such as a GPS signal. The timing module 222 may display the target time and/or countdown time as a time indicia on the display 215.

The location module 223 identifies the spatial location of the positional guidance system 200. In some embodiments, the location module 223 includes a communications unit for receiving location information from a suitable communications source. For example, the location module 223 may communicate with radio-navigation satellites, such as a GPS satellite 230, to receive location data. The location module 223 may display the location of the positional guidance system 200 as location indicia on the display 215. The location module may also store location information associated with one or more destinations.

In preferred embodiments, the navigation device receives input data from sensors 240 which may be a plurality of sensors configured to measure ambient conditions. The sensors 240 collects sensor data from each of the plurality of sensors and passes the sensor data to other positional guidance system components for analysis and/or storage. The sensors may be configured to provide sensor data either continuously or periodically.

In an embodiment, the sensors 240 may include one or more wind sensors, compasses and boat speed sensors. The one or more wind sensors measure an apparent wind angle and an apparent wind speed, which may be thought of as the direction and strength of the wind experienced by an observer on board the boat. The wind sensor may be any suitable means for measuring wind strength and wind direction, for example the wind sensor may comprise an anemometer and a wind vane. The compasses may be any suitable means for identifying the heading of the sailing boat relative to due north, such as a gyroscopic or magnetic compass. The boat speed sensors may be any suitable means for measuring the speed of the sailing boat relative to the water or land and may be, for example, a paddlewheel or sonic sensor.

The input data collected by the sensors 240 may be communicated to the calculation module 221 for data analysis and/or data processing or to the local database 213 for storage.

In an alternative embodiment, input data may be provided by data received from a suitable communications source such as a GPS satellite 230, as further described below. In an alternative embodiment, input data may be manually provided via, for example, the interactive portion of a display as described above. In another embodiment, input data may be partially provided by a combination of one or more of the sensors, communication source or manually input data.

In one embodiment, the positional guidance device 200 may communicate with one or more external systems 260 via a communications network 250. For example, the data collected by sensors 240 may be communicated to a remote database via communications network 250. The communications network 250 may also enable the positional guidance device 200 to communicate with one or more mobile devices 270 to send data to and/or receive data from the mobile devices. The communications network 250 may be any suitable known means of connecting the positional guidance device to the external devices. For example, the communications network 250 may be provided by a local area network (LAN), wireless local area network (WLAN), wide area network (WAN), satellite link, cellular communication networks and the like. Communications via the communications network 250 may be in any suitable known wired and/or wireless protocols. Suitable wired communications may be performed via USB or Ethernet connections. Suitable wireless communications may be performed via Bluetooth, WiFi, Internet communication protocols, cellular communication protocols, RFID, NFC or the like.

Figure 3A:
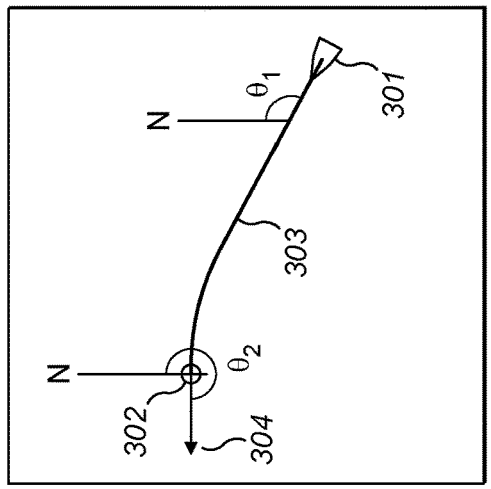
FIG. 3A shows a schematic diagram of a first example step for producing a visual representation according to an embodiment of the invention.
Figure 3B:
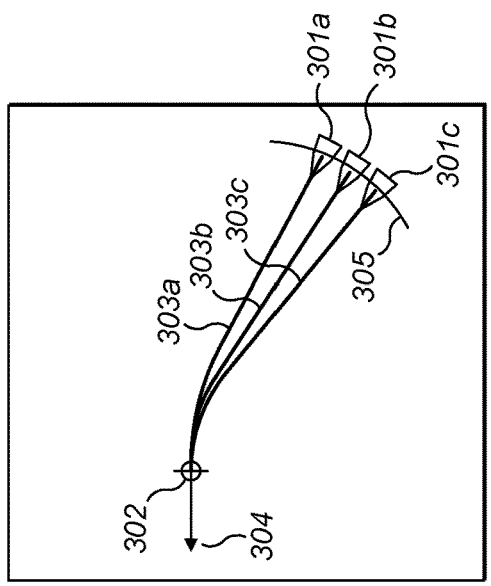
FIG. 3B shows a schematic diagram of a second example step for producing a visual representation according to an embodiment of the invention.
Figure 3C:
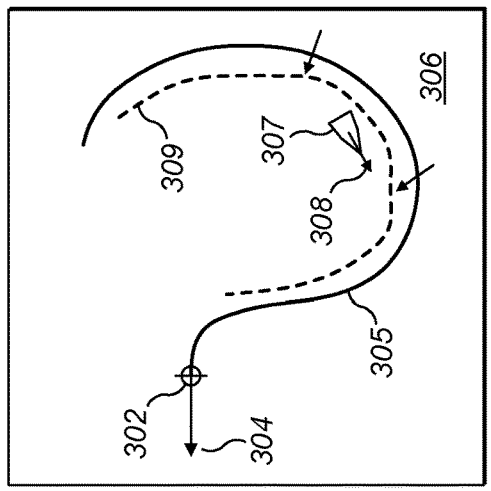
FIG. 3C shows a schematic diagram of a third example step for producing a visual representation according to an embodiment of the invention.

FIG. 3A to 3C are schematic diagrams which give an overview of how a visual representation may be produced by the positional guidance system described above.

In a first step, represented in FIG. 3A, the system calculates a first location 301 where the sailing boat may be located in order to arrive at a destination 302 at a target time for a given bearing, theta_one. The system calculates the first location based on a target time to arrive at the destination and an obtained optimum boat speed for the sailing boat travelling along a route 303 towards the destination. The system may also calculate the first location based on knowledge of the selected route 303 the sailing boat takes to the destination 302. For example, in the example shown in FIG. 3A, the route the sailing boat follows includes a turn onto a target angle theta_two such that the sailing boat is travelling in a predetermined direction 304 at the destination. The process of calculating the optimum boat speed and the route that may be taken are described further below.

In a second step, represented in FIG. 3B, the system repeats the above calculation for each of a plurality of other bearings associated with the route 303a, 303b and 303c, thereby producing a plurality of locations 301a, 301b and 301c where the sailing boat may be located in order to arrive at the destination 302 at the target time. The system joins each of the plurality of locations with a line to form a boundary 305. Additionally, the system may define a zone bounded at least in part by the boundary 305 and/or the plurality of calculated locations.

In some embodiments, the system does not perform the second step. Instead, only a single location is calculated and used to define a boundary indicating whether the sailing boat 301 will arrive at the destination 302 at the target time. This advantageously allows the system to operate on devices with poor computational power, such as smart watches. In these embodiments, the visual representation may be in the form of a one-dimensional line where the destination, boundary and current location of the sailing boat are relatively positioned on the line. In this embodiment, the zone described above will be understood to be the section of line on the opposite side of the boundary from the destination.

In a third step, represented in FIG. 3C, the system displays a visual representation of the zone 306 in relation to the destination 302. In some embodiments, the system also displays the sailing boat's current location 307, however in other embodiments the sailing boat's location is not required to be displayed, for example when an AR headset is used as a display. Additionally, the system may display a visual representation of the boundary 305 and the heading 308 of the sailing boat. The system repeats the above calculations periodically to produce a visual representation of the zone and the current location of the boat, either of which may change with time. As shown in FIG. 3C, as time progresses the boundary 305 shrinks inwards. Accordingly, after a certain period of time the boundary 305 moves to the location identified by dotted line 309. So long as the sailing boat location remains within the boundary, i.e. does not enter zone 306, it is possible for the sailing boat to arrive at the destination 302 at the target time.

Accordingly, aspects of the sailing boat may be adjusted in response to the displayed visual representation. For example, the heading, performance or configuration of the sailing boat may be adjusted in response to the displayed visual representation.

As it will be noted from the above brief description, the boundary 305 is calculated without considering the sailing boat's actual location or bearing. Instead, the boundary 305 is calculated using a predicted optimum boat speed, and a known route associated with a plurality of likely bearings the sailing boat could take.

Figure 4A:
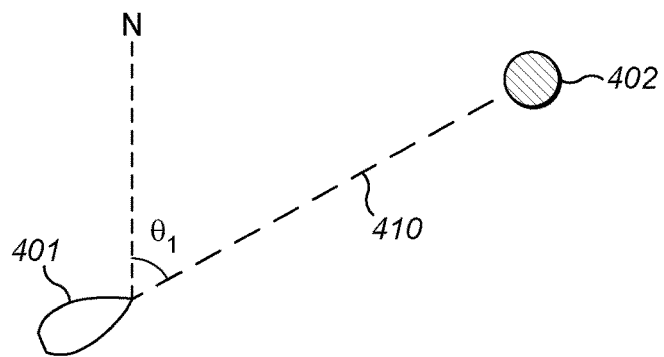
FIG. 4A shows a first example route that a boat may take to a destination.
Figure 4B:
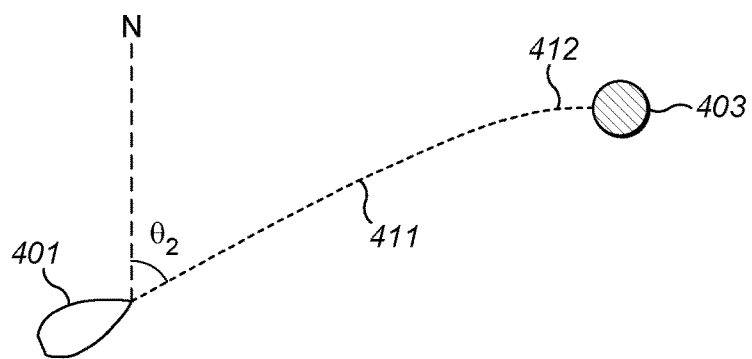
FIG. 4B shows a second example route that a boat may take to a destination.
Figure 4C:
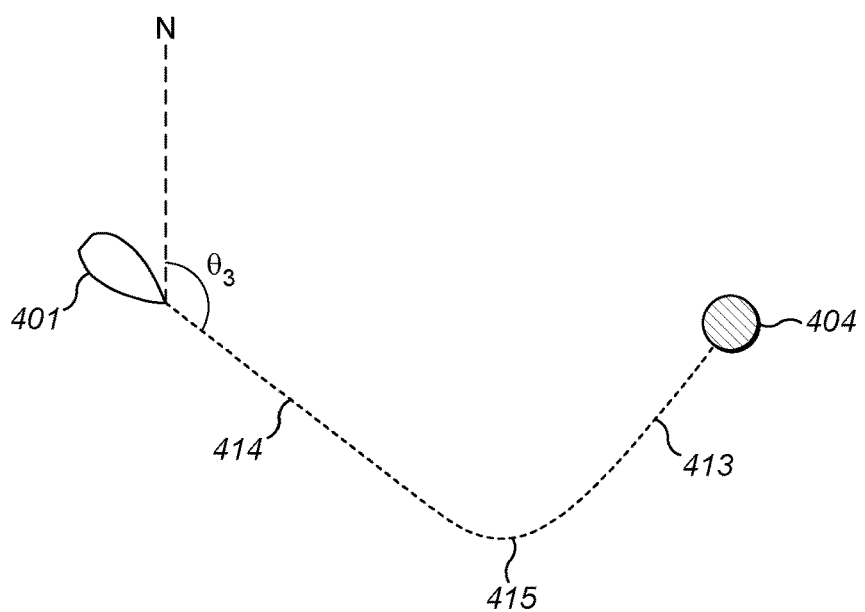
FIG. 4C shows a third example route that a boat may take to a destination.

The route that the sailing boat may take to the destination can vary. FIGS. 4A to 4C illustrate some example routes from a first sailing boat location 401 to a destination 402.

Each of these predetermined routes may be modelled by the system using different route metrics associated with each route.

Route metrics are additional mathematical parameters which may be included in the calculations performed by the system to adjust for different routes that the boat make take to arrive at the destination, as further described below with reference to FIGS. 4A, 4B and 4C. The parameter values may be determined by analysing boat performance data collected over a variety of weather conditions and boat configurations and may vary significantly from boat to boat.

In a first example, the boat 401 may follow a straight line 410 to the destination 402, as shown in FIG. 4A where the boat sails towards the destination at a bearing of theta_1 from due north. The route metrics associated with this route may include a scaling parameter. The calculations performed by the system assume that the sailing boat 401 is performing at optimum performance. However, a sailing boat 401 may not always sail at the predicted performance. The route metrics may account for this discrepancy by including a scaling parameter. For example, if the boat speed is predicted to be 20 knots but is measured to be 15 knots then a suitable scaling parameter may be applied to ensure that the calculated boundary lines correspond to the boat's actual performance.

Another example of a route the boat 401 may take to the destination 402 is shown in FIG. 4B. It is often advantageous in a sailing boat race to arrive at a destination at a target angle and at a target speed. The target angle and target speed are often known in advance of arriving at the destination and ensure the sailing boat favourably starts the next stage of the race. Therefore, the boat's route to the destination may mostly include sailing in a straight line 411 at a bearing of theta_2 from due north, with a turn 412 onto the target angle when arriving at the destination. Additionally, the boat may accelerate or decelerate at any point on this route to arrive at a target speed. Further, the sailing boat will also accelerate or decelerate during the turn onto the target angle due to the changing wind conditions. Therefore, in addition to a scaling parameter, the route metrics may additionally include route curvature parameters to account for the rate of curvature when turning onto the known target angle and acceleration parameters to account for the rate of acceleration and deceleration of the boat during the curve and elsewhere on the route.

Another example of a route the boat 401 may take to the destination 402 is shown in FIG. 4C. It is often advantageous to sail to a destination along a layline 413 running from the destination, as described above with reference to FIG. 2. Therefore, another route the boat 401 may take is to sail in a straight line 414 at a bearing theta_3 from due north towards a layline 413 before turning 415 onto the layline. Again, the route metrics associated with this route may include scaling parameters, route curvature parameters and acceleration parameters to account for the sailing boat's route.

Route metrics therefore enable a variety of different route options to be accounted for and displayed to a user, thereby providing the user with greater flexibility and tactical options during the race.

Figure 5:
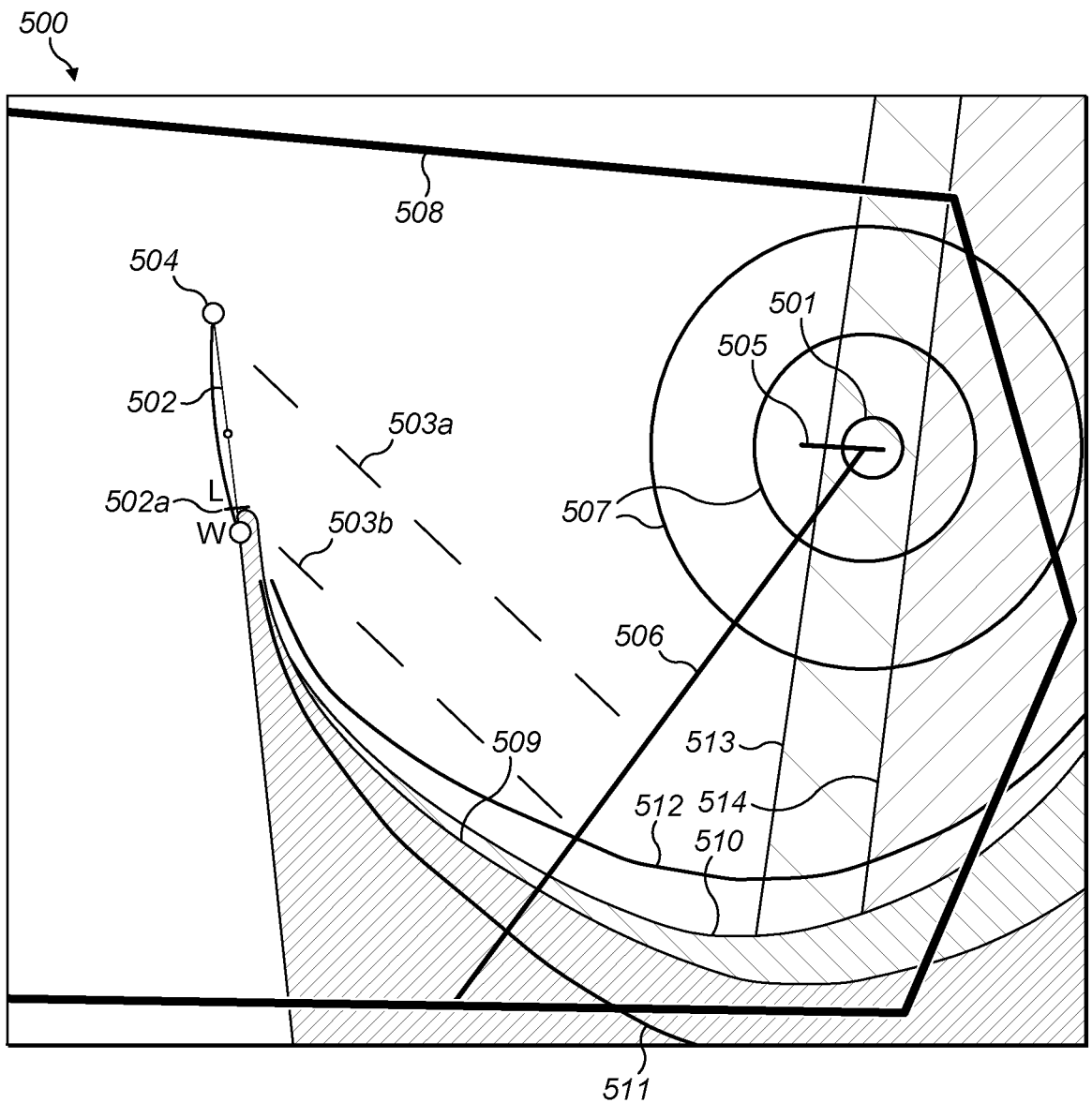
FIG. 5 shows an example display image from a positioning guidance system according to an embodiment of the invention.

FIG. 5 illustrates an example graphic user interface display 500 for guiding a sailing boat to a destination in accordance with an embodiment of the invention.

The display 500 shows a sailing boat 501 heading towards a destination, which in the example of FIG. 5 is a race starting line 502. However, it will be appreciated that in other embodiments the destination may be a defined point rather than a line. For example, as also shown in FIG. 5, a preferred destination may be a favoured starting point 502a which may be identified in advance as the optimum location for the sailing boat to cross the starting line. In other embodiments, the destination may be a waypoint on the race course. Laylines 503a, 503b are displayed extending from an upwind marker 504 and the favoured starting point 502a.

The display 500 includes heading indicia 505, route indicia 506 and proximity indicia 507. The heading indicia 505 may indicate the current heading of the sailing boat 501, the route indicia 506 may indicate a preferred course that the boat should ideally follow, and the proximity indicia 507 may indicate a set distance from the sailing boat. For example, the proximity indicia 507 may indicate distances of 50 m and 100 m from the sailing boat. The display also includes course limit indicia 508. The course limit indicia 508 may indicate an area within which the boat must remain during the race as may be defined by rules associated with a race.

The display 500 also includes several boundary indicia which each define a boundary, for example the boundary 305 described above with reference to FIGS. 3A to 3C. The position of the boundary indicia relative to the location of the sailing boat provides tactical information to a user by indicating whether the sailing boat is predicted to arrive at a destination earlier or later than a target time. The locations of the boundary indicia are calculated as described further below and are updated periodically to provide real-time information to the user. Accordingly, the locations of the boundary indicia change with time.

The display 500 shown in FIG. 5 includes first arrival boundary indicia 509 and second arrival boundary indicia 510. When positioned on the first arrival boundary indicia 509 the sailing boat 501 will arrive at the destination exactly on the target time if sailed at an optimum speed towards the destination. The first arrival boundary indicia 509 therefore defines an isochronic line associated with a target time to arrive at the destination, thereby illustrating the boundary between the sailing boat 501 arriving at the destination early or late.

The second arrival boundary indicia 510 is also an isochronic line that defines a boundary between the sailing boat 501 arriving early and arriving late. However, the second arrival boundary indicia 510 includes a performance scaling parameter to enable the system to account for variations in boat performance, as further described below.

Display 500 also includes first auxiliary arrival boundary indicia 511 and second auxiliary arrival boundary indicia 512. The auxiliary arrival boundary indicia enable the system to account for variations in local conditions, for example changing wind strength. As the speed of a sailing boat is inextricably linked to local environmental conditions such as water current and wind strength, it is advantageous for the system to account for variations in the local environmental conditions observed within a given time frame. Therefore, the first auxiliary arrival boundary indicia 511 defines an isochronic line associated with a set of optimum conditions, for example the maximum recorded wind speed, and the second auxiliary arrival boundary indicia 512 defines an isochronic line associated with a set of worst conditions, for example the minimum recorded wind speed. The first and second auxiliary arrival boundary indicia 511, 512 may be produced by applying a suitable performance scaling parameter as described above.

Display 500 may additionally show first layline boundary indicia 513 and second layline boundary indicia 514. As indicated above, it is often preferable for a sailing boat to sail in parallel to a layline. It is therefore advantageous for the system to provide an indication of whether the sailing boat 501 will arrive at a destination at a target time by sailing towards a layline before turning onto the layline until arriving at the destination. The first and second layline indicia 513, 514 may each define an isochronic line associated with a layline. In the example shown in FIG. 5, the first layline indicia 513 and second layline indicia 514 are both associated with layline 503*b* originating from the favoured starting point 502*a*. Each of the first and second layline indicia 513, 514 may be associated with a different performance scaling parameter to allow for variations in boat performance.

It should be noted that the boundary indicia described above are not affected by the current heading of the sailing boat. Therefore, a helmsman or other user of the system may easily identify the following information with certainty from the example display shown in FIG. 5:

firstly, since the sailing boat 501 is located on the opposite side of boundary 513 from the destination, the sailing boat 501 will arrive at the destination 502 late by following a route along route indicia 506 and along layline 503*b* if the sailing boat performs according to a first performance scaling parameter;

secondly, since the sailing boat 501 is located on the same side of boundary 514 as the destination, the sailing boat 501 will arrive at the destination 502 early by following a route along route indicia 506 and along layline 503*b* if the sailing boat performs according to a second performance scaling parameter;

thirdly, if not following a layline to the destination, the sailing boat 501 has time to burn even for the weakest wind conditions and sailing at a sub-optimal speed since the sailing boat 501 is located on the same side of boundaries 509, 510, 511 and 512 as the destination.

The boundary indicia described above are calculated as further described below with reference to FIG. 6, which is an example flowchart illustrating how data may be used to produce the example graphical display shown in FIG. 5.

Figure 6:
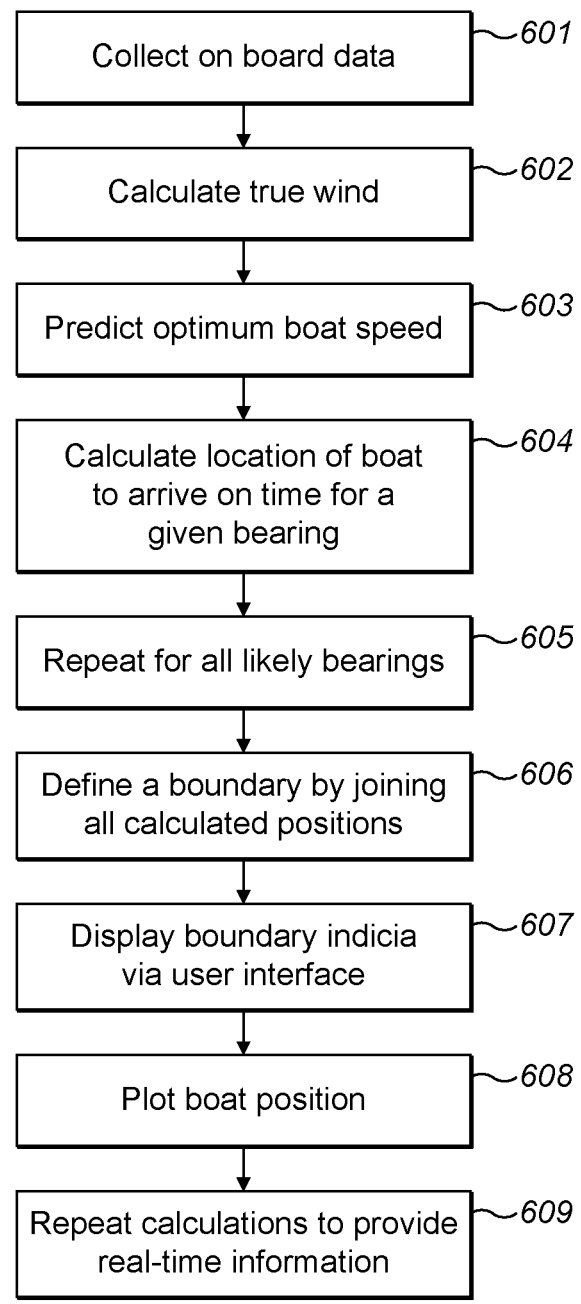
FIG. 6 shows a flow diagram of an example process for obtaining graphical features within the display of FIG. 5.

In the example flowchart of FIG. 6, on-board data is measured and collected in step 601. For example, the sensors 109 may collect data for the boat speed, apparent wind direction and apparent wind speed. Apparent wind is the wind experienced by an observer in the same frame of reference as the sail boat. The apparent wind speed and direction are therefore easily measured by on board instruments. However, as is well known in the art, a component of the apparent wind speed and direction is caused by the sailing boat's motion and so the measured apparent wind is not a suitable measurement for use in all calculations. The apparent wind will vary considerably, for example whether the boat is sailing upwind or downwind, whereas the true wind is not affected by the boat's course. It is therefore preferable to perform calculations using the true wind, which is relatively stable, rather than the readily measured apparent wind.

In step 602, the true wind direction and speed may be calculated in ways known in the art. For example, a vector analysis of the boat speed, apparent wind direction and apparent wind speed may be performed, thereby deriving the true wind direction and true wind speed. Alternatively, the true wind speed and true wind direction may be derived from the following mathematical formula:

$$v_{TW} = \sqrt{[v_{AW}\sin(B_{AW})]^2 + [v_{AW}\cos(B_{AW}) - v_{boat}]^2}$$

-continued
$$B_{TW} = \arctan\left[\frac{v_{AW}\sin(B_{AW})}{v_{AW}\cos(B_{AW}) - v_{boat}}\right]$$

Where:
$v_{TW}$ is the true wind speed;
$v_{AW}$ is the apparent wind speed;
$v_{boat}$ is the boat speed;
$B_{TW}$ is the true wind direction; and
$B_{AW}$ is the apparent wind direction.

In step 603, the optimum boat speed is identified. The optimum boat speed may be based on the calculated true wind and a database of stored data.

In some embodiments, the stored data includes polar data, which is known in the art to be performance related information for a particular boat in different wind conditions. In particular, polar data provides a boat's optimum speed for given wind speeds and wind angles. This data is usually displayed as a graph plotted in polar coordinates where the radial and angular components of the polar plot are the true wind speed and true wind direction respectively. The optimum boat speed for a given true wind direction and speed may be obtained by inspection from the polar plot or by graphical solution.

In some embodiments, multiple databases of polar data may be utilised. For example, some sailing boats may be configured in a number of different ways to ensure that the performance of the boat can be adapted to different conditions. Accordingly, each boat configuration may be associated with a different database of polar data containing performance related data for the particular configuration.

Polar data may be obtained from a variety of sources, for example through computer modelling or by gathering and storing a dataset of boat performance.

The stored data may also include tide maps containing data associated with local tidal patterns, such as how the speed and direction of the water flow changes with time for a given locality. As a destination may be fixed to the ground, tides and currents will cause the body of water and therefore also the boat, to move relative to the destination Tide data can be used in ways known in the art to predict boat speed and direction relative the ground. The stored data may also include wind maps containing data associated with measured, predicted or observed wind patterns, which may also be used in the calculation.

In alternative embodiments, the optimum boat speed is calculated from GPS data. GPS data may contains COG and SOG or alternatively, recording the GPS data of a sailing boat will provide a history of the latitude and longitude of the sailing boat over time. Analysis of the latitude and longitude can identify the average speed the sailing boat has travelled at, known as the speed over ground (SOG), and the direction of travel of the sailing boat, known as the course over ground (COG). Other instrumentation can provide heading data. The average wind direction may be estimated using the COF or heading if the boat is sailing at a known or input angle to the wind In another embodiment, the user may manually input data to obtain an optimum boat speed. For example, the user may input a boat speed to be used as the predicted boat speed for calculations.

In step 604, the system calculates the furthest location the boat may be from the destination in order to arrive at the destination on time by travelling along a known route on a particular bearing. The position is calculated using the VMG predicted in step 603, a target time to arrive at the destination and known route metrics parameters.

In step 605 the system repeats the calculation of step 604 for all likely bearings that the sailing boat could take on a particular route to arrive at the destination on time. Therefore, in step 605 the system calculates a plurality of locations whereby the sailing boat could arrive at the destination at the target time. The system only performs calculations for a selection of bearings that the sailing boat is likely to take. For example, sailing boats will typically approach a destination from one known direction due to the layout of the race course. Performing calculations for approaching the destination from the other direction would therefore not be useful to the helmsman. The calculations may therefore be performed using one hemisphere of all possible bearings. Additionally, as sailing boats cannot sail directly into the wind, certain bearings may be improbable, undesirable or impossible and so the system need not perform calculations for those bearings. Accordingly, there is a range of bearings which may be used by the system. In some embodiments, the range of bearings is approximately 150 degrees. However, it will be appreciated that this range of bearings will vary, for example due to different sailing boat configurations.

It should be noted that the calculations performed by the system do not take into consideration certain data associated with the sailing boat, such as the current heading of the boat. Instead, the calculations use a range of predicted headings which the boat could take. As previously mentioned, known navigational systems which use the current boat heading in their calculations produce results with large variation. Decoupling data associated with the sailing boat, such as the current boat heading, from the boundary calculations advantageously ameliorates this problem.

In step 606 the system identifies a boundary by joining the plurality of calculated positions obtained from step 605. Since the boundary connects locations whereby a sailing boat may arrive at a destination at the same target time, the boundary may be known as an isochronic line.

In step 607 the system displays a boundary indicia on a user interface which shows the location of the calculated boundary to a user.

In some embodiments, the system displays the boat's current location on the user interface relative to the calculated boundary in step 608. This allows the user to identify the relative difference between the calculated boundary and the current location of the boat and use that knowledge to tactically position the sailing boat as described above. However, it will be understood that the boat location may not always be displayed, for example in embodiments where AR headsets are used as a display.

Finally, in step 609 the system repeats the above steps periodically in time to update the relative positions between the boat's current location and the calculated boundary. In some embodiments, the calculations are performed at a frequency sufficient to provide a smooth animated graphic without consuming too much computer memory. For example, in a specific embodiment, the calculations are performed at a frequency of several times per second to provide real-time information to the helmsman.

The above description is directed towards a single destination of interest. However, in some embodiments there may be a plurality of destinations of interest. For example, a starting line of a sailing boat race may have a number of favourable starting positions due to the environmental conditions. Accordingly, the system may generate graphical elements for each of the plurality of destinations as described above for a single destination.

Figure 7:
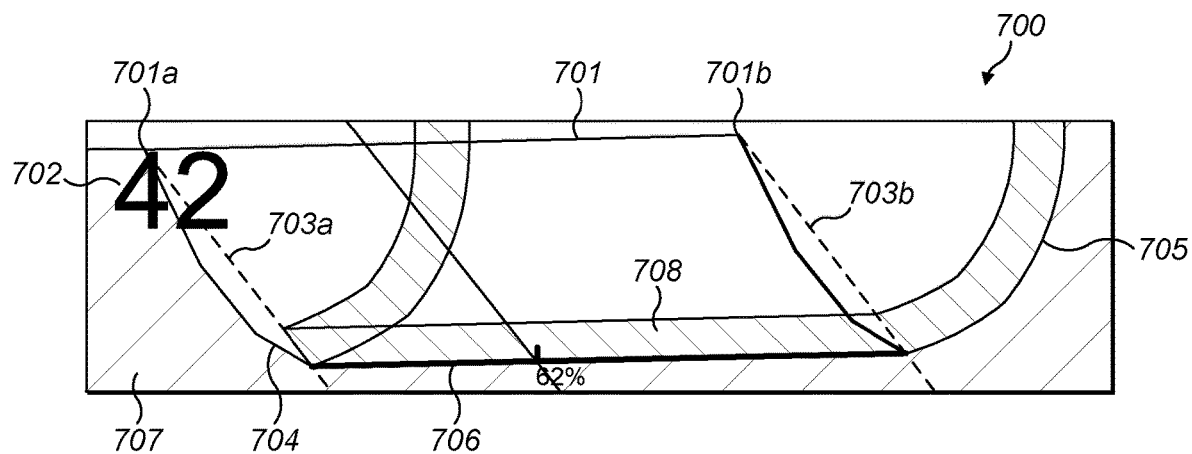
FIG. 7 shows an example display image from a positioning guidance system according to a further embodiment of the invention.

In embodiments further to the above, FIG. 7 shows a specific example of generating graphical elements for each of a plurality of destinations where each of the plurality of destinations are separate points on a start line.

The display 700 of FIG. 7 shows a race starting line 701 with laylines 703a, 703b extending from the each extreme end of the race starting line 701a, 701b. The display 700 includes a first boundary 704, a second boundary 705, and a third, intermediate, boundary 706. Each of these boundaries is associated with one of a plurality of destinations. In the example of FIG. 7, a first destination 701a is one end of a racing start line while the second destination 701b is the other end of a racing start line.

A time to start indicia 702 indicates how early or late the sailing boat would arrive at a destination, as discussed above.

The system calculates the first boundary 704 and the second boundary 705 as described above with reference to FIGS. 3A to 3C. The first boundary 704 is calculated using a first subset of bearings from the first destination 701a, the first subset of bearings terminating at the bearing of layline 703a. The second boundary 705 is calculated using a second subset of bearings from the second destination 701b, the second subset of bearings commencing from the bearing of layline 703b, which is usually the same bearing as layline 703a.

For example, if the laylines extend at a bearing of 45 degrees from the start line, the first subset of bearings may include bearings between 0 degrees to 45 degrees from the first destination 701a, and the second subset of bearings may include bearings between 45 degrees to 180 degrees from the second destination 701b. It will be appreciated that this range of bearings is exemplary only and, as indicated above, in preferred embodiments the range of bearings is approximately 150 degrees but this range of bearings may vary, for example due to different sailing boat configurations.

The first and second boundaries 704, 705 will be separated and so an intermediate boundary 706 is calculated to join the first and second boundaries 704, 705 such that the third boundary 706 is parallel to the line connecting the first and second destinations 701a, 701b. In the example of FIG. 7, the line connecting the first and second destinations 701a, 701b is the race starting line 701.

Thus, the first, second and third boundaries 704, 705, 706 shown in FIG. 7 define an isochronic line associated with a target time. Accordingly, the isochronic line defines the locus of calculated positions indicating whether a sailing boat sailing according to a predetermined route will arrive at the racing start line 701 early or late. When positioned on the isochronic line the sailing boat will arrive at the start line 701 exactly on the target time if sailed as calculated towards the destination along the predetermined route. When positioned outside the isochronic line in zone 707, the sailing boat will arrive at the start line 701 after the target time. Accordingly, zone 707 may be understood to be a late-arrival zone.

Figure 8:
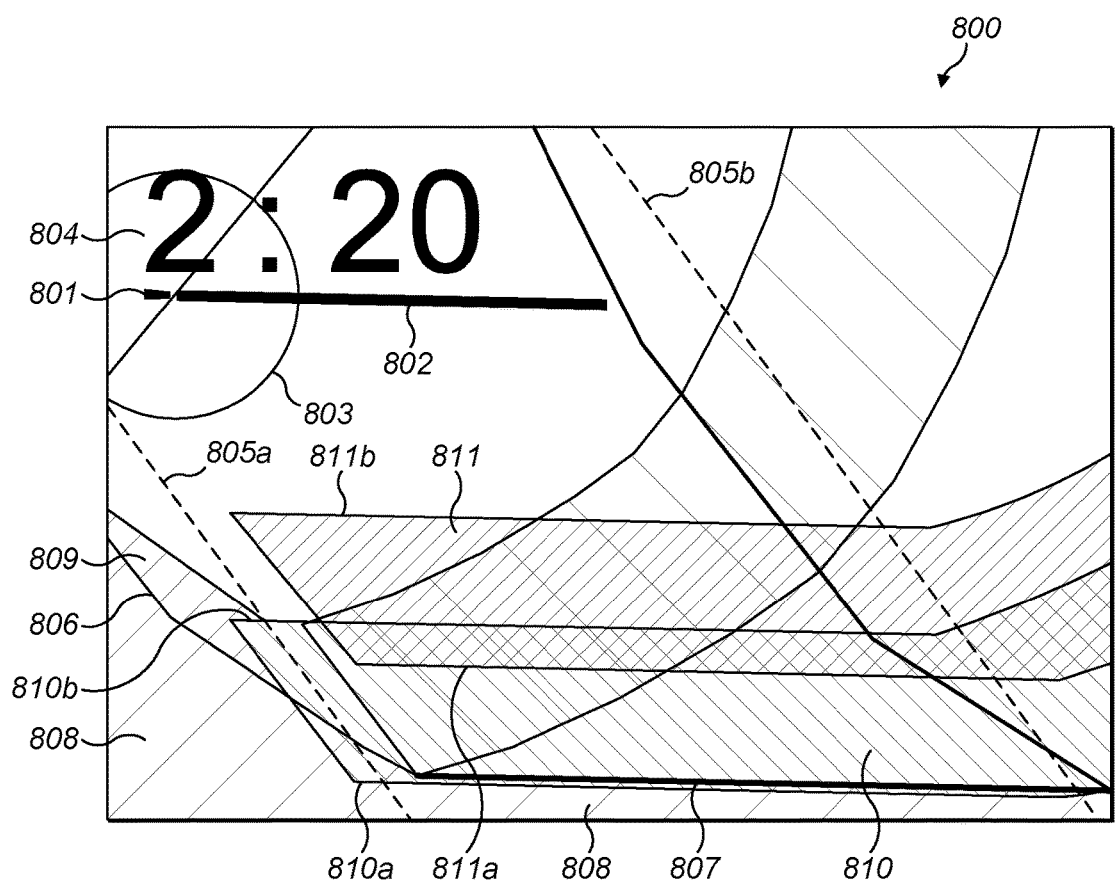
FIG. 8 shows an example display image from a positioning guidance system according to another embodiment of the invention.

Similarly to the display shown in FIG. 5, the display 700 also includes an auxiliary arrival boundary indicia 708. As discussed further above, the auxiliary arrival boundary indicia 708 defines an isochronic line associated with sub-optimum sailing conditions and may be produced by applying a suitable performance scaling parameter FIG. 8 shows an embodiment of the invention further to those described above in which the system calculates graphical elements associated with a route that includes a manoeuvre. Accordingly, the FIG. 8 illustrates predetermined routes further to the above that are also modelled by the system using different route metrics for each of the routes.

The display 800 of FIG. 8 shows a sailing boat 801, heading indicia 802, proximity indicia 803, time to gun indicia 804, laylines 805*a*, 805*b*, a first boundary 806, an intermediate boundary 807, a late-arrival zone 808 and an auxiliary boundary indicia 809, as described above.

Further to the above, display 800 also includes a first manoeuvre indicia 810 and a second manoeuvre indicia 811.

The first manoeuvre indicia 810 indicates the locations where a sailing boat may be positioned and have enough time to execute a first manoeuvre before proceeding to, and arriving at, the racing start line on time. In the specific example shown in FIG. 8, the first manoeuvre is a tack, whereby the sailing boat makes a turn into the wind before proceeding to, and arriving at, the race starting line.

The second manoeuvre indicia 811 indicates the locations where a sailing boat may be positioned and have enough time to execute a second manoeuvre before proceeding to, and arriving at, the racing start line on time. In the specific example shown in FIG. 8, the second manoeuvre is a gybe, whereby the sailing boat makes a downturn turn before proceeding to, and arriving at, the race starting line.

It will be understood that the display may display either or both of the manoeuvre indicia 810, 811 as desired.

In the example of FIG. 8, the first manoeuvre indicia 810 is defined by one or more isochronic lines 810*a*, 810*b*, each of the isochronic lines comprising one or more boundaries. In the example shown in FIG. 8, each isochronic line 810*a*, 810*b* comprises two boundaries, which correspond to the second boundary 705 and third boundary 706 described above.

Similarly to the first manoeuvre indicia 810, the second manoeuvre indicia 811 is defined by one or more isochronic lines 811*a*, 811*b* each comprising one or more boundaries.

When calculating the first manoeuvre indicia 810, the one or more boundaries that comprise isochronic line 810*a* are calculated in the same manner as above for boundaries 704, 705 and 706. However, the predicted boat locations that define isochronic line 810*a* are calculated such that they include a time to execute the first manoeuvre. Similarly, the one or more boundaries that comprise isochronic line 810*b* are calculated based on a target time, which includes a time to execute the first manoeuvre, and a performance scaling parameter to enable the system to account for variations in boat performance, as described above for boundary indicia 510. Accordingly, the width of the first manoeuvre indicia 810 may be understood to represent a range of different sailing boat performances. The time taken to execute the first manoeuvre may be looked up in a performance table based on current or optimum sailing conditions.

It will be appreciated that the second manoeuvre indicia 811 may be calculated in the same manner as described above for the first manoeuvre indicia 810, except that calculations are performed which include a time to execute the second manoeuvre.

As described above for different routes, the location of each of the manoeuvre indicia 810, 811 may be calculated using route metrics associated with the particular manoeuvre. For example, the route metrics may include route parameters to account for the sailing boat trajectory when executing the manoeuvre and acceleration parameters to account for the rate of acceleration and deceleration of the boat during the manoeuvre. Accordingly, the relative positions of the first manoeuvre indicia 810 and second manoeuvre indicia 811 on the screen can be adjusted by changing the route metrics and route parameters associated with each manoeuvre. For example, executing a manoeuvre with a smaller rate of turn (i.e. a turn involving a bigger arc) would require additional time and space to execute the manoeuvre. Accordingly the calculated position of the associated manoeuvre indicia would change. The above example of using a larger turning arc, the associated manoeuvre indicia would be shifted up the page. Accordingly, the calculated boat positions take into account the time taken to execute a particular manoeuvre, such as a tack or a gybe.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

While the invention has been described above in detail with reference to various specific embodiments, it will be appreciated by those skilled in the art that various modifications may be made to those embodiments without departing from the scope of the appended claims.

The invention claimed is:

1. A positional guidance system for a sailing boat comprising:
  a database configured to receive and store an optimum boat speed based on input data;
  a timing module configured to identify an arrival time for the sailing boat to arrive at a destination;
  a calculation module configured to periodically calculate a predicted boat location for a bearing associated with a predetermined route to a destination based on the arrival time, optimum boat speed, and known route parameters associated with the predetermined route, the known route parameters comprising a scaling parameter, a route curvature parameter, or an acceleration parameter;
  a processor configured to define a zone bounded at least in part by the predicted boat location; and
  a display configured to display, to a user and in response to a user input, a visual representation of the zone and a first arrival boundary indicia that defines an isochrone representing one or more boat locations where the sailing boat will arrive at the destination at the arrival time when travelling at the optimum boat speed.

2. The positional guidance system of claim 1, wherein one or more boat performance configurations are adjusted in response to the displayed visual representation.

3. The positional guidance system of claim 1, wherein the display forms part of a desktop computer, a laptop computer, a tablet computer, a personal digital assistant, a mobile telephone, a smartphone, a smart watch, a pair of smart glasses, or an augmented reality system.

4. The positional guidance system of claim 1, further comprising a location module for identifying a current location associated with the sailing boat, wherein the display is further configured to display the current location of the sailing boat.

5. The positional guidance system of claim 1, further comprising sensors, a communication source, or an interactive portion of the display for at least partially providing input data.

6. The positional guidance system of claim 1, wherein the predetermined route comprises a straight line to the destination.

7. The positional guidance system of claim 1, wherein the predetermined route comprises a curved path onto a predetermined bearing when approaching the destination.

8. The positional guidance system of claim 1, wherein the predetermined route comprises a straight line to a layline associated with the destination and travelling to the destination along the layline.

9. The positional guidance system of claim 1, wherein a zone is defined for each of a plurality of destinations.

10. The positional guidance system of claim 1, wherein a zone is defined for each of a plurality of destinations that is defined at least in part by a first boundary associated with a first destination, a second boundary associated with a second destination, and a third boundary that connects the first and second boundaries and is parallel to a line connecting the first destination and the second destination.

11. The positional guidance system of claim 1, wherein a zone is defined for each of a plurality of destinations that is defined at least in part by a first boundary associated with a first destination wherein the first boundary is defined by the predicted boat locations associated with each of a plurality of bearings from the first destination, and a second boundary associated with a second destination wherein the second boundary is defined by the predicted boat locations associated with each of the plurality of bearings from the second destination.

12. The positional guidance system of claim 1, wherein a zone is defined for each of a plurality of destinations that is defined at least in part by a first boundary associated with a first destination, a second boundary associated with a second destination, and a third boundary that connects the first boundary and the second boundary with a straight line having end points that intersect a layline from the first destination and a layline from the second destination.

13. The positional guidance system of claim 1, wherein the predetermined route comprises a tack maneuver or a gybe maneuver.

14. The positional guidance system of claim 1, wherein the calculation module is configured to calculate a predicted boat location for each of a plurality of bearings that defines a boundary between the sailing boat arriving early or late at the destination for the plurality of bearings from the destination.

15. The positional guidance system of claim 1, wherein the calculation module is configured to periodically calculate the predicted boat location defining the boundary between the sailing boat arriving early or late at the destination and displaying, with the display, a visual representation of the boundary that shrinks inwards as time progresses.

16. The positional guidance system of claim 1, the display further configured to display a first maneuver indicia and a second maneuver indicia, each indicia comprising an isochrone line defined at least in part by predicted boat locations associated with one or more bearings from a first destination and one or more bearings from a second destination, the predicted boat locations being calculated to include a time to execute the respective maneuver.

17. The positional guidance system of claim 1, the display further configured to display a first maneuver indicia and a second maneuver indicia wherein each of the first maneuver indicia and the second maneuver indicia comprise a second isochrone line defined at least in part by a performance scaling parameter.

18. The positional guidance system of claim 1, the display further configured to display a plurality of maneuver indicia, each indicia comprising an isochrone line related to a respective maneuver.

19. A positional guidance method for a sailing boat, the method including:
   obtaining an optimum boat speed based on input data;
   identifying, with a timing module, an arrival time for the sailing boat to arrive at a destination;
   calculating, with a calculating module, a predicted boat location for a bearing associated with a predetermined route to a destination, the predicted boat location based on the optimum boat speed, the arrival time, and known route parameters associated with the predetermined route, the known route parameters comprising a scaling parameter, a route curvature parameter, or an acceleration parameter;
   defining, with a processor, a zone bounded at least in part by the predicted boat location;
   repeating the above steps periodically; and
   displaying, with a display to a user in response to user input, a visual representation of the zone and a first arrival boundary indicia that defines an isochrone representing one or more boat locations where the sailing boat will arrive at the destination at the arrival time when travelling at the optimum boat speed.

20. The positional guidance method of claim 19, wherein the obtaining an optimum boat speed based on input data comprises calculating the optimum boat speed with a calculating module.

21. The positional guidance method of claim 19, further comprising the step of adjusting boat performance configurations in response to the displayed visual representation.

22. The positional guidance method of claim 19, further comprising identifying, with a location module, a current location associated with the sailing boat, and displaying, with the display, the current location of the sailing boat.

23. The positional guidance method of claim 19, wherein the calculation module calculates a predicted boat location for each of a plurality of bearings that define a boundary between the sailing boat arriving early or late at the destination for the plurality of bearings from the destination.

24. The positional guidance method of claim 19, wherein the calculation module periodically repeats the calculation of the predicted boat location defining the boundary between the sailing boat arriving early or late at the destination and displaying, with the display, a visual representation of the boundary that shrinks inwards as time progresses.

25. A non-transitory, computer-readable medium comprising machine-readable instructions that, when executed by a processor of a computing device, cause the computing device to at least:
   obtain an optimum boat speed based on input data;
   identify an arrival time for a sailing boat to arrive at a destination;
   calculate a predicted boat location for a bearing associated with a predetermined route to a destination, the predicted boat location based on the optimum boat speed, the arrival time, and known route parameters associated with the predetermined route, the known route parameters comprising a scaling parameter, a route curvature parameter, or an acceleration parameter;
   define a zone bounded at least in part by the predicted boat location; and
   display, to a user in response to user input, a visual representation of the zone and a first arrival boundary indicia that defines an isochrone representing one or more boat locations where the sailing boat will arrive at the destination at the arrival time when travelling at the optimum boat speed.

\* \* \* \* \*